Dec. 22, 1953                E. JANTSCH                2,663,321
                      TUBULAR HEAT TRANSFER APPARATUS
Filed July 19, 1947                                3 Sheets-Sheet 1
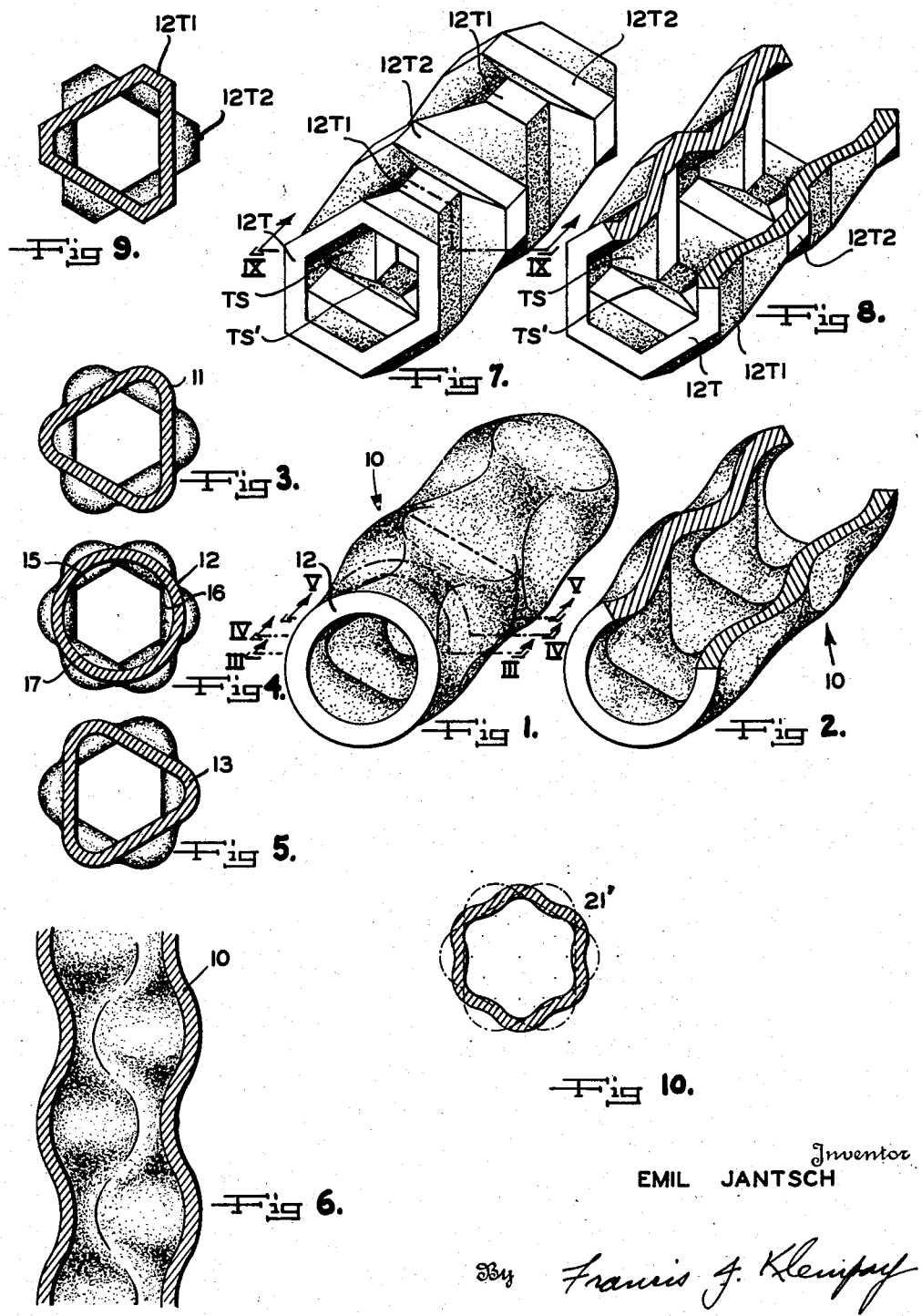
Inventor
EMIL JANTSCH

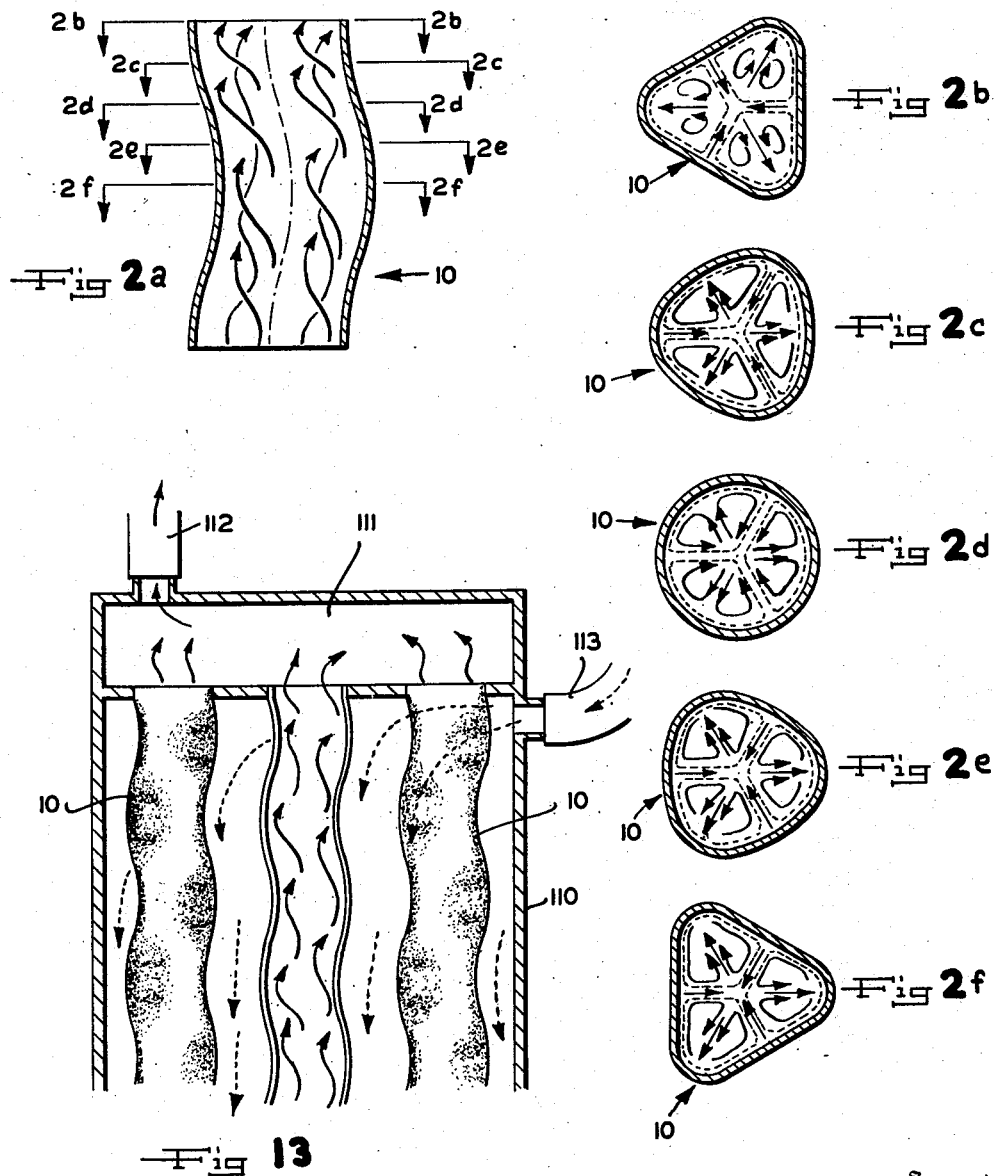

Patented Dec. 22, 1953

2,663,321

UNITED STATES PATENT OFFICE 2,663,321

TUBULAR HEAT TRANSFER APPARATUS

Emil Jantsch, Youngstown, Ohio, assignor to
O. F. Gayton, Youngstown, Ohio

Application July 19, 1947, Serial No. 762,134

2 Claims. (Cl. 138—38)

This invention relates to the general art of transferring heat to or from a column of fluid passing longitudinally through an elongated passage as a tube, for example. The process of interchanging heat as between the fluid column and the physical material of the walls of such passage has wide application, of course, and most important among the applications are the exchange of heat from a fluid medium confined in a heat conducting tube to a fluid medium outside the tube and the absorption and emission of heat by the material constituting the side wall of a tube with respect to fluid flowing through the tube as in a regenerator, for example. In either of these systems the primary function is to obtain a rapid imparting or extraction of the heat with respect to the fluid and in the case of gases it is important that all the respective finite portions thereof be brought into contact or close proximity with the wall surface of the tube because of the inherent insulating quality of gases. As the temperature differential lowers this aspect of the problem becomes more critical and, further, in order to provide an efficient system it is also necessary to insure that substantially the entire extent of the heat exchanging surface be swept by the gas. Many proposals have heretofore been made for accomplishing these objectives such as the employment of tubes of flattened or odd cross-section and the use of indentations or other deformities for the purpose of effecting turbulence and more intense scrubbing of the fluid in the tube. These proposals, however, have generally been discarded since the accompanying disadvantages of requiring greatly increased power for moving the fluid through the tubes and of having a much greater tendency to foul up outweighs the advantage of greater heat transfer in most instances. It is the primary object of the present invention to provide an improved tubular structure for heat transfer purposes which while exhibiting remarkably increased efficiency as regards the transfer of heat between the side wall of the tube and the fluid passing through it is nevertheless entirely free from any clogging tendencies and is capable of being operated with a minimum expenditure of power for moving the fluid through the tube.

The above general object of the present invention is accomplished through the use of a heat transfer tube having a fluid impervious wall which is so shaped as to effect in the column of fluid moving through the tube a series of localized and circumferentially spaced eddyings about axes extending substantially parallel with the longitudinal axis of the tube. In this manner an effective kneading of the fluid in the column is obtained and all portions of the fluid in the column are progressively brought into intimate wiping contact with the surface of the wall of the tube. This can best be accomplished by deforming the side wall of the tube to provide cross-sectional areas of varying shape in planes normal to the longitudinal axis of the tube and spaced longitudinally therealong. To minimize clogging tendencies and to provide for a smooth non-pulsating flow of fluid through the tube as well as to reduce to the absolute minimum the amount of power required to force the fluid through the tube the tube is constructed to have substantially uniform cross-sectional area in each and every plane normal to the axis of the tube and spaced outwardly therealong.

A further object of the invention is to provide various practical methods whereby heat transfer tubes of the general nature discussed above may be commercially produced in volume.

The above and other specific objects and advantages of the invention will become apparent upon consideration of the following detailed specification and the accompanying drawing wherein there is disclosed certain preferred embodiments of the invention.

In the drawing:

Figure 1 is a perspective view of a short length of tubing constructed in accordance with the principles of my invention and representing the preferred embodiment of my invention as applied to heat exchanging tubes;

Figure 2 is a sectional view of the tube of Figure 1;

Figure 2a is a longitudinal section of the tube of Figures 1 and 2;

Figures 2b through 2f are transverse sections of the tube of Figure 2a taken along the lines 2b through 2f, respectively, of Figure 2a.

Figure 11:
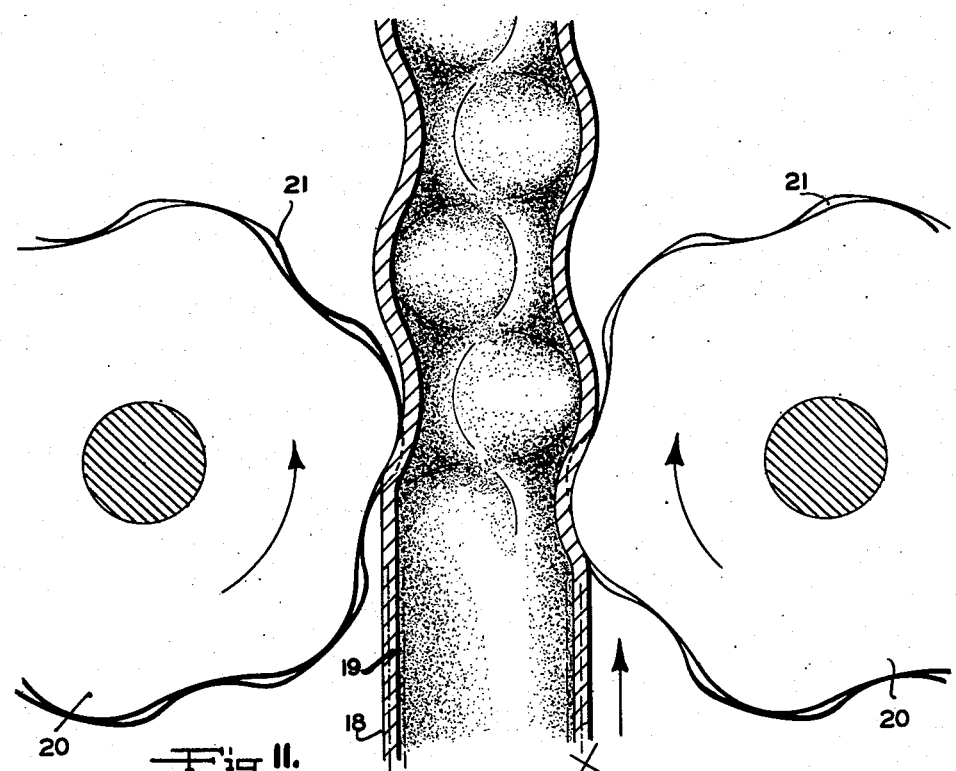
Figure 12:
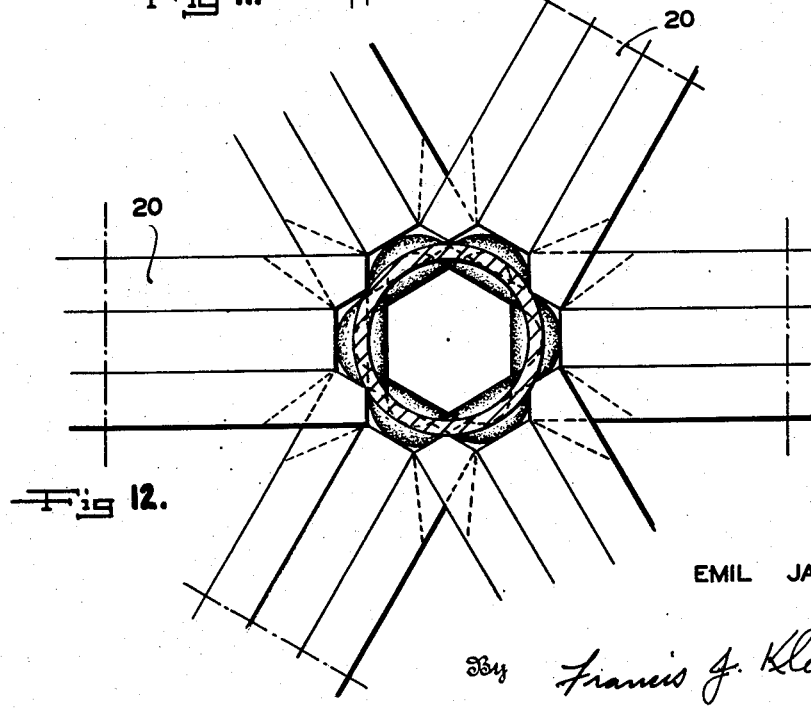

Figures 3, 4 and 5 are transverse sectional views taken along the lines III—III, IV—IV and V—V, respectively, of Figure 1;

Figure 6 is a longitudinal section of the heat exchanging tube of Figure 1;

Figure 7 is a perspective view of a length of tubing constructed according to the teaching of my invention and representing a more theoretical embodiment of the invention;

Figure 8 is a sectional view in perspective of the tube of Figure 7;

Figure 9 is a transverse sectional view taken along the lines IX—IX of Figure 7;

Figure 10 is a transverse sectional view of a further embodiment of my invention;

Figures 11 and 12 are longitudinal and transverse sectional views of a tube being formed in accordance with my invention, the views illustrating apparatus which may be employed for this purpose; and Figure 13 is a fragmentary longitudinal section through a heat exchange device utilizing the tubes of Figures 1 and 2.

Referring to the drawing in detail, the reference numeral 10 designates generally a length of metal tubing which is constructed in accordance with the principles of my invention and, as shown, this tubing is generally round but is specifically deformed in the manner shown and now to be described. The shape of the cross-sectional area of the tube is in substantially continuous transition first from the triangle shown at 11 in Figure 3 to the circle shown at 12 in Figure 4 and then to the triangle shown at 13 in Figure 5 after which the transition progresses again to a circle and thereafter to a next succeeding triangle having the orientation of the triangle 11 of Figure 3. This cycle of shapes is repeated ad infinitum throughout the length of the tube and by analysis of the surfaces shown on the drawing it will be at once apparent that fluid flowing through the tube will move with an undulated flow as is apparent from an examination of Figure 6. Further, by referring to Figure 4 it will be observed that three equally circumferentially spaced areas (designated by reference numerals 15, 16 and 17) will progress in an axial direction from arcuate form to linear form to make up the sides of the triangular section shown in Figure 5 and, further, that the circumferential portions of the ring 12 intermediate the formative portions of the sections 15, 16 and 17 will progress axially in a diverging manner and with a decrease in radius of curvature to form the rounded apices of the triangular section 13. Thus we can see that a segment or circumferential component of the fluid column moving through the tube and which is acted upon jointly by one of the areas 15, 16 or 17 and one of the adjacent intermediate areas will be subjected to a twisting force causing this fluid column component to spiral about a longitudinal axis. Since in the embodiment specifically illustrated six such components will result from the circular-triangular shaped transition all portions of the fluid flowing through the tube will be brought into repeated contact or close proximity with the wall of the tube thus insuring maximum heat transfer between the fluid and the physical material of the tube wall. By way of explanation, the spiralling of these circumferentially spaced segments of the fluid column flowing through the tube is caused by the fact that in each theoretical segment a portion of outer circumference gradually recedes from the central axis of the tube while the outer circumference of the remaining adjacent portion of the segment simultaneously inclines inwardly toward the axis. This imparts a definite couple to the segment of the fluid column to rotate this segment about a general axis which is substantially parallel with the longitudinal axis of the tube.

The above described action can be better understood through consideration of the embodiment shown in Figures 7 and 8 wherein a generally hexagonal shaped tube having the cross-section shown at 12T is deformed in such manner as to provide longitudinally even-spaced triangular cross-sections 12T1 and 12T2 having an orienting variation of 60° in successive adjacent triangular sections. Thus, as shown in Figure 7, the apice of any one triangular section is adjacent to the base of the next adjacent triangle section either fore or aft. The configuration of this tube is such that a plane normal to the general axis of the tube and intermediate any two adjacent triangular sections of the tube will intersect the tube along the exact pattern of 12T in Figure 7. Now we can see that as the fluid column progresses in the direction shown from the first triangular section 12T1 to the reoriented triangular section 12T2 a portion of the circumferential extent of the column will be forced inwardly by three circumferentially spaced transition surfaces one of which is shown at TS in Figures 7 and 8. Further, a circumferential segment of the fluid column which is adjacent that segment impinging on the surface TS will be allowed to simultaneously recede from the axis of the tube by reason of the convergence of the contiguous transition surface TS'. In this manner a definite swirling action is imparted, not to the fluid column as a whole, but to circumferentially spaced or related segments thereof and therefore there is much less stratification or stagnation of fluid in the column than is present in shape-deformed heat transfer tubing heretofore proposed. Further, an analysis of the shapes, particularly of the practical embodiment of Figures 1 and 2 will readily show that all the interior surface of the tube is fully and intensely swept by the fluid in the column flowing through the tube. This sweeping is necessarily of greater intensity than occurs in tubing of uniform cross-section, for example, and consequently the tubing of my invention, in addition to its improved characteristic as regards the rate of heat transfer, is much less prone to incrustation and clogging.

It can be shown mathematically and experimentally that the most severe impediment to the flow of fluid in a tube of varying cross-sectional shape is the variation in the cross-sectional area of the tube. There is a substantial loss of pressure head in the fluid each time an enlargement is encountered in the conduit and a lesser loss each time a contraction is encountered. While these losses are reduced somewhat by streamlining as in the embodiment of Figures 1 through 6 the loss is quite substantial when taken over an appreciable length of tubing, as one of 50 diameters, for example. If in a round tube of such proportion and of uniform cross-section the friction loss factor is taken as 1, this factor jumps to 9.479 upon the round tube being gradually deformed to sharp triangular shape (area=.605 round tube area) with a spacing of 3 diameters between each successive triangular section. I have therefore determined that it is of the utmost importance, in heat transfer tubing of the general type under consideration herein, to provide substantially uniform cross-sectional area throughout the entire longitudinal extent of the tube or pipe.

By referring more particularly to Figures 2a through 2f the nature of the invention will be more fully understood by analyzing the character of the fluid flow which results from the above described configuration of the tube of the invention, the movement of particles of the fluid being depicted graphically in these figures by the curved arrows shown. Now it should be remembered at the outset that in the case of a straight tube the fluid flow will be purely laminar with the maximum velocity at the center if the mean velocity is below the critical point at which turbulence will occur. This character of flow results in a deep effective boundary layer or stagnant fluid film adjacent the surface of the passage which is highly insulating. If, however, the tube is made with sinuous directing surfaces as in the present invention, the laminar nature of the flow is broken up and the stagnant film thickness reduced or eliminated. This is accomplished by the present invention in the following manner:

Since in any closed vessel a fluid will flow in a direction tending to equalize the pressure at a velocity determined by the impelling pressure or force and the inertia of the fluid, it can readily be understood that as the moving fluid column reaches the section shown in Figure 2b the tendency of the fluid will be to move radially inward from the center portions of the flats of the triangle and radially outward into the apices thereof. This will result in the formation of six rotative couples shown in Figure 2b which have the effect of inducing six localized spiralings in the fluid column. At the intermediate section 2c where the apices are partially drawn in while the flats are partially moved out the zones of compression will now be transferred to the apices while the zones of expansion are transferred to the flats so that the couples are re-oriented 60 degrees whereby the fluid which had previously been moved into the apices in Figure 2b is now brought toward the axis of the tube and in part re-directed toward the center of the flats of the triangle. In progressing from section 2c to the circle of 2d the kneading action will be sustained not only because of the inertia of the fluid but also because of the configuration and orientation of the next succeeding transition section 2e whereat the receding apices of the section draw the fluid outwardly while the inward movement of the flats tend to force fluid components inwardly. This action continues progressively to section 2f which completes a cycle.

It should be particularly observed that the kneading action resulting from the shown configuration of the tube is such that the respective spiral eddyings of the fluid flow have rolling contact with each other whereby while particle velocities are greatly increased to break down the stagnant boundary layer, the internal friction is kept to a minimum so as not to increase appreciably the pressure drop in the tube due to internal friction. It should also be noted that since each passage increment is symmetrical about the longitudinal axis of the tube there will be no abrupt changes in direction of movement of the fluid bulk or any particle thereof and so the gradually changing nature of the shape factor as well as the uniform cross-sectional area of the tube will result in an undulating flow contour net with all the surface of the tube fully swept. The invention therefore enables me to provide a heat exchanging tube which, while being deformed to increase its heat transfer coefficient is yet capable of being operated with only a minor increase in the power required to force a predetermined quantity of fluid through a particular tube. Also, such tube will have minimum fouling tendency and for a given capacity will occupy a minimum of space with least bulk and weight.

The heat transfer tubing of my invention accordingly has substantially uniform cross-sectional area and the impartation of this characteristic to the tubing may, of course, be accomplished in various ways depending on the physical nature of the side walls of the tubing. In the case of metallic heat exchanging tubing, for example, wherein the base stock employed is normally round tubing of substantially uniform wall thickness and cross-sectional area it will at once be apparent that immediately upon deforming any cross-section of the tube out of its round shape the cross-sectional area of such section will diminish. In order to compensate for this factor in the manufacture of tubing such as shown in Figures 1 and 2, for example, I preferably begin with tubing which has a somewhat greater cross-sectional area than that finally desired for the transitional circular sections of the finished tube and by referring to Figures 11 and 12 which illustrate one method which may be employed for manufacturing such tubing, the initial stock shown at 18 is of larger diameter than that desired in the final product. The broken lines shown at 19 in Figure 11 represent the diameter of the circular transition sections of the finished tubing. This reduction in diameter requires, of course, a shortening of the perimeter of the circular section which may be accomplished by "sinking" the tube at appropriate points and in progressively decreasing extent on either side of the circular sections. Thus at the section 12 of Figure 1 where the circular form gives maximum area for a predetermined perimeter the sinking is maximum and progressively decreases in extent during the transition to the triangular section 13 where no sinking occurs. Thus I am able to provide a practical tubing structure of continuously varying cross-sectional shape without varying the cross-sectional area of the tube. Tubing of this nature may be manufactured in commercial quantities by a set of interlocking roller dies 20 each having a properly contoured peripheral forming surface 21 and each mounted to revolve in a plane passing through the longitudinal axis of the tube being formed. As shown in Figure 12 the roller dies 20 have a face width approximately equal to the projection of 60° of the circumference of the tube so that upon six such dies being employed the entire circumference of the tube is constrained in at least one transverse plane in the die throat thereby making it possible to reduce the perimeter of the tube wall where required and to the extent required. Normally the greater part of the excess metal resulting from the sinking is taken up by a slight increase in the thickness of the tube wall but some longitudinal distribution of this excess metal may also be effected, if desired, by applying tension to the tube stock. It should be understood that methods other than that specifically described herein may be employed in manufacturing the tube of my invention.

It is known that the shape factor also enters into the extent of friction in the flow of fluids through pipes and it can be shown experimentally that if the coefficient of friction of a given length of round pipe is taken as 1, the coefficient of friction in an equilateral sharply triangular pipe of equal length and cross-section will be 1.655. For blunted triangular shape as shown in Figures 3 and 9 this factor will be of the order of 1.2. Since this factor in the flow resistance is relatively small as compared to the above given example of flow resistance encountered in tubes of varying area it is at once apparent that the maintaining of uniform area is normally much more important than the maintaining of uniform shape.

It should now be apparent that I have provided an improved heat transfer apparatus in the form of a tube for conducting fluid medium which accomplishes the objects initially set out. Through the use of a tubular passage which continuously changes shape in such manner and with adequate frequency to impart an undulating motion to the fluid with localized spiral flow therein while yet maintaining the cross-sectional area of the tube passage, I provide a heat transfer element which exhibits greatly improved characteristics as regards efficiency of heat transfer without requiring any excessive increase in power required to move the fluid medium through the tube. This being the basic premise of the invention it should be apparent that the invention has wide applicability and therefore the scope of the invention should not be limited to the specific application suggested by the disclosure herein. For example, the principles of the invention are equally applicable to regenerators wherein the side walls of the tubes are formed of heat storing material with the shape of the passages through the material for the heat admitting or absorbing fluid medium being shaped in accordance with the principles taught herein. Also, the specific configurations of the cross-sectional areas of the tubes are largely a matter of choice since all the advantages of the invention may be retained with cross-sectional areas of widely varying shape. In Figure 10, for example, I have shown a tube section 21' which corresponds in general with the tube section 12 of Figure 1 but in which the excess metal of the round stock tube is absorbed by undulations formed in a side wall of the tube instead of by wall thickening or longitudinal elongation as explained above. The undulations of the section 21' may, of course, be imparted by proper design of the roller dies 21 and it will be obvious that the area enclosed by the tube and section 21' will be materially reduced from the area which would be enclosed by the wall if circular.

In addition to the improved characteristics of the tube of my invention pointed out above, the invention has further advantages particularly when incorporated in metallic tubes for heat exchanging purposes wherein heat is to be transferred from a fluid medium outside the tubes to a fluid medium inside the tubes or vice versa. Assuming that the heat exchanging tubes are arranged in multiple in a suitable housing for the outer fluid medium and that the outer fluid medium is to flow generally parallel with the axes of the tubes, it will be observed that there will likewise be no variation in the cross-sectional area available for the flow of the exterior fluid. This is highly desirable in many installations since it reduces the friction loss in the flow of the exterior fluid and, further, through imparting an undulating flow to the exterior fluid as well as effecting complete wiping of the exterior surfaces of the tubes with the exterior fluid the rate of heat exchange will be maintained at a maximum while the power required to move the fluid will be minimized. In the case of lateral exterior fluid flow the heat exchanging tubes can be readily staggered and spaced so as to present a uniform cross-sectional area in each and every plane normal to the direction of fluid flow for the flow of fluid over and about the tubes.

In Figure 13 there is illustrated a conventional heat exchanging assembly in which the heat exchanging tubes are arranged in the manner described above. The assembly may comprise an outer casing 110 for encasing a multiplicity of the heat exchanging tubes 10 and a header 111 into which the tubes 10 discharge. Any suitable means as the conduit 112, for example, may be employed to conduct the fluid out of the header 111 and as the conduit 113, for example, to conduct fluid into the casing 110, although it will be understood that in actual practice conduits 112 and 113 will be relatively much larger and have streamlined discharge or entry ports to keep the loss of head to a minimum.

While I have referred above to a triangular section in certain specific embodiments of my invention, it should be understood that in practice this section will more preferably be in the nature of a blunted triangle or irregular hexagon as suggested in Figures 5 and 9, for example, since such variation presents a number of advantages without mitigating appreciably the more important aspects of the invention concerning the kneading action of the undulating flow contour and the absence of pulsation which makes difficult the forcing of fluid longitudinally of the tube—either interiorly or exteriorly. Firstly, the transition from round to blunted triangular or irregular hexagonal is readily accomplished, mechanically, without injuring the side wall of the tube and secondly, the shape resistance factor is much less, as pointed out above. In a regular hexagon (cross-section of a fluid conducting tube) the fluid radius is very nearly as large as and therefore the flow resistance is almost as low as that of a circle. It can be shown that this resistance factor increases only slightly as the hexagon is deformed into a more generally triangular shape and all these considerations are applicable to fluid flow both interiorly of the tube and exteriorly thereof as in heat exchangers, for example, where a plurality of fluid conducting tubes are positioned in spaced parallel relation in an outer shell through which other fluid is flowing longitudinally of the tubes. Also, it should be noted that a tube of hexagonally cross-section and uniform wall thickness is the only kind of tube (other than square or triangular) which can be employed in a group (parallel contacting relation) to provide fluid passages both in the inside and outside of the respective tubes each of which are identical. The flow resistance of these hexagonal interior and exterior passages is considerably less than the flow resistance which would be encountered in such passages if the tubes were square or triangular in cross-section. I therefore consider the use of the hexagonal sections of regular or deformed (blunted triangle) character intermediate the circular sections of the tube to be particularly advantageous irrespective of whether or not compensation is made for the slight variation which will occur in the cross-sectional area of the tube in its transition from round to deformed shape. I consider this combination of sections as an inherent part of my invention and by the term "blunted triangle" I also refer to the rounded triangular shape shown in Figure 5.

Any of the heat exchange tubes disclosed herein may, of course, be provided with longitudinally, circumferentially, or spirally disposed heat exchanging fins for parallel, cross, and cross-flow of an exterior stream of fluid as will be understood. It should also be observed that in the case of a group of parallel tubes having substantially uniform cross-sectional area and uniform wall thickness as well as continuously changing shape the above-explained considerations as to undulating fluid flow without pulsation or loss of head due to numerous velocity changes are equally applicable to streams of fluid flow exteriorly of the tubes as well as to fluid flow within the tubes.

Since the invention disclosed herein is capable of widely varying embodiments reference should be had to the appended claims in determining the scope of the invention.

What I claim is:

1. A heat transfer device comprising an elongated tubular member having a fluid impervious wall, the inner surface of said wall having longitudinally spaced polygonal cross sections with the tube at each side of the polygonal cross section being gradually sunken to form an undulating inner surface having a continuously changing shape with a uniform cross sectional area at right angles to the general longitudinal axis of the tube, said spaced polygonal sections being even-sided hexagons and the wall of the intermediate sunken portion of the tube having a hexagonal shape which is predominantly triangular in shape.

2. The heat transfer device comprising an elongated tubular member having a fluid impervious wall, the inner surface of said wall having longitudinally spaced circular cross sections with the tube at opposite sides of the circular cross sections being gradually sunken at opposite sides of the longitudinal axis of the tube to provide an undulating inner surface, the cross sectional shape at right angles to the longitudinal axis of the tube in the sunken surface constantly changing its shape and having a uniform cross sectional area, said cross sections of the intermediate sunken portions are generally equilateral triangles with the points of the triangle rounded.

EMIL JANTSCH.

References Cited in the file of this patent

UNITED STATES PATENTS

| Number | Name | Date |
|---|---|---|
| 249,547 | Reed | Nov. 5, 1881 |
| 811,016 | Whyte | Jan. 30, 1906 |
| 1,315,853 | Nordling et al. | Sept. 9, 1919 |
| 1,318,210 | La Boiteaux | Oct. 7, 1919 |
| 2,061,132 | Bell | Nov. 17, 1936 |
| 2,061,134 | Schwarz | Nov. 17, 1936 |